United States Patent
Yanagi et al.

(10) Patent No.: US 10,927,790 B2
(45) Date of Patent: Feb. 23, 2021

(54) CYLINDER HEAD GASKET

(71) Applicant: NOK CORPORATION, Tokyo (JP)

(72) Inventors: Tokunori Yanagi, Makinohara (JP);
Yuki Nakagawa, Makinohara (JP);
Takanori Anzai, Makinohara (JP);
Mitsuyasu Nakajima, Makinohara (JP)

(73) Assignee: NOK CORPORATION

( * ) Notice: Subject to any disclaimer, the term of this patent is extended or adjusted under 35 U.S.C. 154(b) by 458 days.

(21) Appl. No.: 15/774,532

(22) PCT Filed: Nov. 18, 2016

(86) PCT No.: PCT/JP2016/084332
§ 371 (c)(1),
(2) Date: May 8, 2018

(87) PCT Pub. No.: WO2017/086469
PCT Pub. Date: May 26, 2017

(65) Prior Publication Data
US 2020/0263630 A1 Aug. 20, 2020

(30) Foreign Application Priority Data

Nov. 20, 2015 (JP) .............................. JP2015-227730
Apr. 14, 2016 (JP) .............................. JP2016-081485

(51) Int. Cl.
*F02F 11/00* (2006.01)
*F16J 15/08* (2006.01)
*F16J 15/12* (2006.01)

(52) U.S. Cl.
CPC ......... *F02F 11/002* (2013.01); *F16J 15/0818* (2013.01); *F16J 15/122* (2013.01);
(Continued)

(58) Field of Classification Search
CPC ..... F02F 11/002; F16J 15/0818; F16J 15/122; F16J 2015/0856; F16J 2015/0862; F16J 2015/0868
See application file for complete search history.

(56) References Cited

U.S. PATENT DOCUMENTS 4,083,570 A    4/1978  Sugawara
4,272,085 A *  6/1981  Fujikawa ............... F16J 15/123
                                                      277/594
(Continued)

FOREIGN PATENT DOCUMENTS

EP    0394145 A1   10/1990
GB    2330182 A     4/1999
(Continued)

OTHER PUBLICATIONS

International Search Report for Patent Application No. PCT/JP2016/084332 dated Feb. 21, 2017 (5 pages).
(Continued)

*Primary Examiner* — Gilbert Y Lee
(74) *Attorney, Agent, or Firm* — Harness, Dickey & Pierce, P.L.C.

(57) ABSTRACT

A cylinder head gasket to be mounted between a cylinder block and a cylinder head of an engine includes: at least one bore-hole plate having a bore hole which corresponds to a cylinder bore of the cylinder block; and a main plate disposed so as to surround the bore-hole plate, wherein the bore-hole plate and the main plate are separated from each other without being in contact with each other, while being connected with each other with a heat insulating member interposed between the bore-hole plate and the main plate.

13 Claims, 4 Drawing Sheets

(52) U.S. Cl.
CPC .............. *F16J 2015/0856* (2013.01); *F16J 2015/0862* (2013.01); *F16J 2015/0868* (2013.01)

(56) References Cited

U.S. PATENT DOCUMENTS

| | | |
|---|---|---|
| 5,033,189 A | 7/1991 | Desverchere et al. |
| 6,139,024 A * | 10/2000 | Yakushiji ............. F16J 15/0825 277/592 |
| 6,371,489 B1 | 4/2002 | Combet et al. |
| 6,390,479 B1 | 5/2002 | Combet et al. |
| 2002/0027327 A1 | 3/2002 | Sugimoto et al. |
| 2002/0074738 A1 | 6/2002 | Bjerk et al. |

FOREIGN PATENT DOCUMENTS

| | | |
|---|---|---|
| JP | S52-053940 U | 4/1977 |
| JP | S52-120206 U | 9/1977 |
| JP | S54-103451 U | 7/1979 |
| JP | 2002-349343 A | 12/2002 |
| JP | 2011-144912 A | 7/2011 |

OTHER PUBLICATIONS

International Preliminary Report on Patentability and Written Opinion for Patent Application No. PCT/JP2016/084332 dated Feb. 21, 2017 (10 pages)

Chinese Office Action for Patent Application No. CN 201680067479.8 dated Jan. 25, 2019 (8 pages).

Extended European Search Report for Patent Application No. EP 16866469.6 dated Jun. 26, 2019 (8 pages).

\* cited by examiner

CYLINDER HEAD GASKET

CROSS-REFERENCE TO RELATED APPLICATIONS

This application is a U.S. National Stage Application of International Application No. PCT/JP2016/084332, filed on Nov. 18, 2016, and published in Japanese as WO 2017/086469 on May 26, 2017 and claims priority to Japanese Application No. 2016-081485, filed on Apr. 14, 2016 and Japanese Application No. 2015-227730, filed on Nov. 20, 2015. The entire disclosures of the above applications are incorporated herein by reference.

BACKGROUND

Technical Field

The present invention relates to a cylinder head gasket, and more particularly, to a cylinder head gasket where heat conduction through the gasket in a plane direction can be suppressed.

Related Art

An engine of an automobile or the like includes a cylinder block having cylinder bores and a cylinder head mounted on the cylinder block. A cylinder head gasket is mounted between the cylinder block and the cylinder head thus providing sealing between the cylinder block and the cylinder head.

In the engine, an air-fuel mixture is combusted in the cylinder bores formed in the cylinder block so that the cylinder block reaches an extremely high temperature. The cylinder head gasket transfers heat of the cylinder block to the cylinder head thus reducing a temperature difference between the cylinder block and the cylinder head and hence, it is possible to suppress the generation of stress caused by a temperature difference between the cylinder block and the cylinder head whereby stable sealing properties can be maintained.

Heat transferred from the cylinder block to the cylinder head gasket reaches a high temperature particularly in the peripheries of bore holes formed corresponding to the cylinder bores where an air-fuel mixture is combusted, and gradually lowers as a distance is increased from the bore holes. In view of the above, conventionally, there has been proposed a cylinder head gasket having the following configuration. That is, the cylinder head gasket is formed using a metal plate. Bore holes are formed in the metal plate, and a high-heat-conductive peripheral edge member having high heat conductivity is integrally formed with peripheral edge portions of the bore holes by welding or the like. With such a configuration, heat in the peripheries of the bore holes is actively transferred to the cylinder head thus eliminating a temperature difference between the cylinder block and the cylinder head at an early stage (JP-2011-144912-A).

Recently, an engine is required to further enhance combustion efficiency so that there is a tendency for the engine to reach a higher temperature. For this reason, it has been required that heat of a cylinder block is efficiently transferred to a cylinder head thus more efficiently reducing a temperature difference between the cylinder block and the cylinder head.

Inventors of the present invention have made extensive studies on a technique of efficiently transferring heat of a cylinder block to a cylinder head with a cylinder head gasket interposed between the cylinder block and the cylinder head. The inventors of the present invention have newly found the following problem.

That is, heat of the cylinder block is transferred not only to the cylinder head through the cylinder head gasket, but heat transferred from bore holes is also transferred through the cylinder head gasket in a plane direction.

Such heat conduction through the cylinder head gasket in the plane direction lowers efficiency of heat conduction to the cylinder head side thus preventing the elimination of a temperature difference between the cylinder block and the cylinder head at an early stage.

In view of the above, it is an object of the present invention to provide a cylinder head gasket where heat conduction through the gasket in a plane direction can be suppressed.

Other objects of the present invention will be apparent from the following description.

SUMMARY OF THE INVENTION

The above-described problems are solved by the following respective inventions.

In a first aspect, a cylinder head gasket is provided to be mounted between a cylinder block and a cylinder head of an engine. The cylinder head gasket comprises:

at least one bore-hole plate having a bore hole which corresponds to a cylinder bore of the cylinder block; and a main plate disposed so as to surround the bore-hole plate, wherein the bore-hole plate and the main plate are separated from each other without being in contact with each other, while being connected with each other with a heat insulating member interposed between the bore-hole plate and the main plate.

In a second aspect, the cylinder head gasket according to the first aspect, further comprises:

an intermediate plate between the main plate and the bore-hole plate, the intermediate plate corresponding to a water jacket formed around the cylinder bore, wherein the main plate, the intermediate plate, and the bore-hole plate are separated from each other without being in contact with each other, and the main plate, the intermediate plate, and the bore-hole plate are connected with each other with a heat insulating member interposed between the main plate and the intermediate plate and between the intermediate plate and the bore-hole plate.

In a third aspect, the cylinder head gasket according to the first or second aspect has, the heat insulating member made of a rubber elastic material.

In a fourth aspect, the cylinder head gasket according to the second or third aspect has, the bore-hole plate and the intermediate plate made of a material having higher heat conductivity than a material for forming the main plate.

In a fifth aspect, the cylinder head gasket according to any one of the first to fourth aspects has, a seal bead integrally formed with the heat insulating member.

In a sixth aspect, the cylinder head gasket according to the fifth aspect has, the heat insulating member including, on an inner peripheral side or an outer peripheral side of the seal bead, a thin wall portion having a smaller thickness than the plate.

In a seventh aspect, the cylinder head gasket according to any one of the first to sixth aspects has, a lightened portion which penetrates the gasket from front to back formed in a portion of the heat insulating member disposed between one bore-hole plate and another bore-hole plate disposed adjacently to said one bore-hole plate, the portion of the heat insulating member reaching a high temperature due to heat from the cylinder bore.

In an eighth aspect, a cylinder head gasket is provided to be mounted between a cylinder block and a cylinder head of an engine. The cylinder head gasket comprises:

at least one bore-hole plate having a bore hole which corresponds to a cylinder bore of the cylinder block; and a main plate disposed so as to surround the bore-hole plate, wherein the bore-hole plate and the main plate are connected with each other with a heat insulating member and a bridge member made of metal interposed between the bore-hole plate and the main plate.

In a ninth aspect, the cylinder head gasket according to the eighth aspect has, at least one bridge member provided for each bore-hole plate.

In a tenth aspect, the cylinder head gasket according to the eighth or ninth aspect has, the bridge member covered by a rubber member.

In an eleventh aspect, the cylinder head gasket according to the eighth or ninth aspect has, the heat insulating member made of a rubber elastic material.

In a twelfth aspect, the cylinder head gasket according to any one of the eighth to eleventh aspect has, a seal bead integrally formed with the heat insulating member.

In a thirteenth aspect, the cylinder head gasket according to the twelfth aspect has, the heat insulating member including, on an inner peripheral side or an outer peripheral side of the seal bead, a thin wall portion having a smaller thickness than the plate.

In a fourteenth aspect, the cylinder head gasket according to any one of the eighth to thirteenth aspect has, a lightened portion which penetrates the gasket from front to back formed in a portion of the heat insulating member disposed between one bore-hole plate and another bore-hole plate disposed adjacently to said one bore-hole plate, the portion of the heat insulating member reaching a high temperature due to heat from the cylinder bore.

Effect of the Invention

According to the present invention, it is possible to provide a cylinder head gasket where heat conduction through a gasket in a plane direction can be suppressed and a temperature distribution can be reduced.

DETAILED DESCRIPTION OF PREFERRED EMBODIMENTS

Hereinafter, embodiments of the present invention are described with reference to drawings.

First Embodiment

In this embodiment, bore-hole plates, an intermediate plate, and a main plate are separated from each other without being in contact with each other, while being connected with each other with a heat insulating member interposed between each bore-hole plate and the intermediate plate and between the intermediate plate and the main plate.

Figure 1:
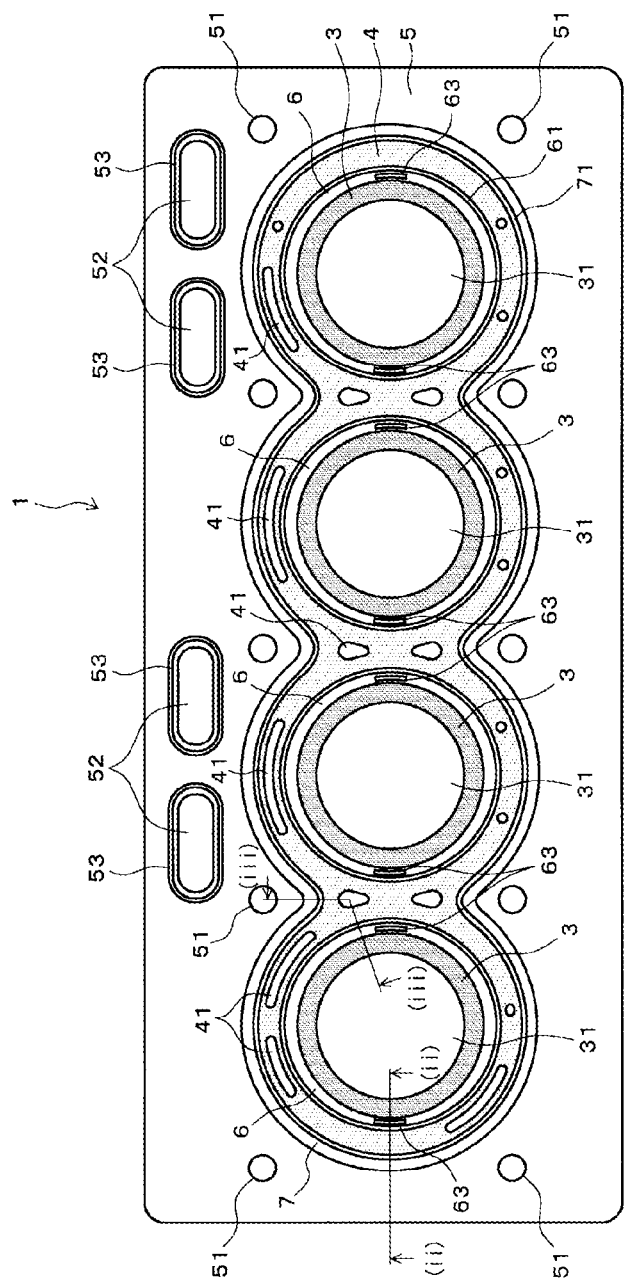
FIG. 1 is a plan view showing one example of a cylinder head gasket according to the present invention.
Figure 2:
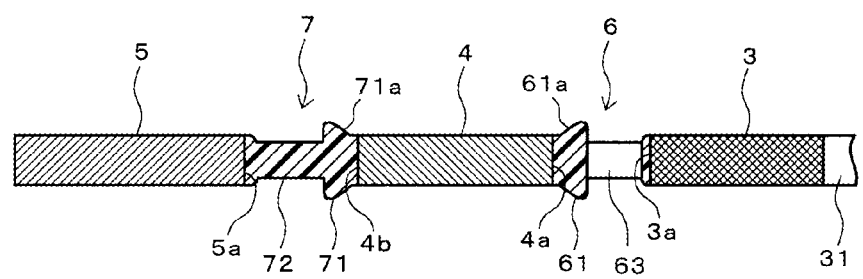
FIG. 2 is a cross-sectional view taken along a line (ii)-(ii) in FIG. 1.
Figure 3:
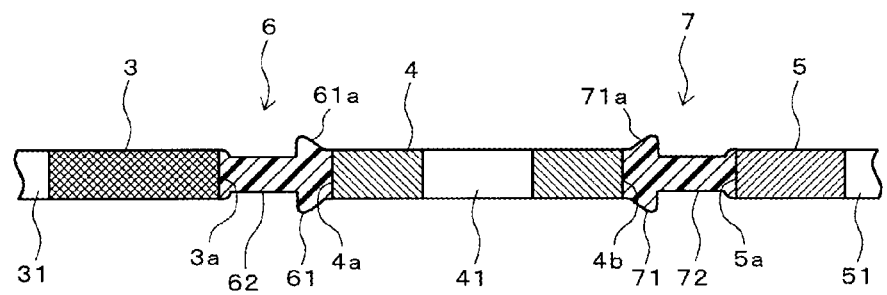
FIG. 3 is a cross-sectional view taken along a line (iii)-(iii) in FIG. 1.
Figure 4:
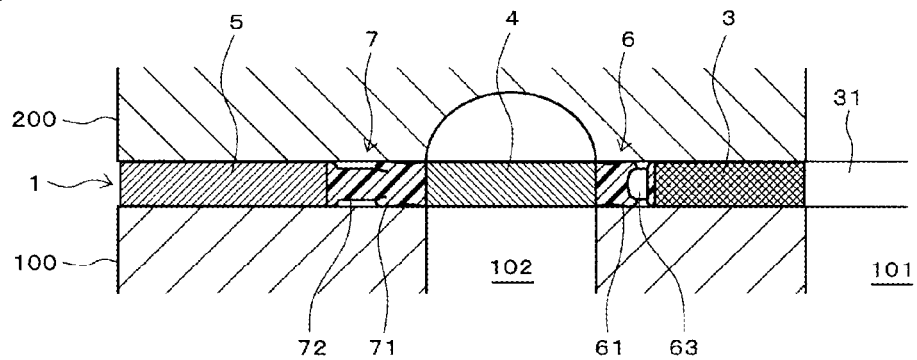
FIG. 4 is a cross-sectional view taken along a line (ii)-(ii) in FIG. 1 showing a state where the cylinder head gasket shown in FIG. 1 is mounted between a cylinder block and a cylinder head.

FIG. 1 is a plan view showing one example of a cylinder head gasket according to the present invention. FIG. 2 is a cross-sectional view taken along a line (ii)-(ii) in FIG. 1. FIG. 3 is a cross-sectional view taken along a line (iii)-(iii) in FIG. 1. FIG. 4 is a cross-sectional view taken along a line (ii)-(ii) in FIG. 1 showing a state where the cylinder head gasket shown in FIG. 1 is mounted between a cylinder block and a cylinder head.

A cylinder head gasket 1 is a gasket mounted between a cylinder block 100 and a cylinder head 200 of an engine.

It is sufficient for the cylinder head gasket 1 to include at least a bore-hole plate 3 and a main plate 5. In this case, the bore-hole plate 3 and the main plate 5 are separated from each other without being in contact with each other.

In this embodiment, an intermediate plate 4 is disposed between the main plate 5 and the bore-hole plates 3, and the intermediate plate 4 corresponds to a water jacket formed around cylinder bores. In this mode, the main plate 5, the intermediate plate 4, and the bore-hole plates 3 are separated from each other without being in contact with each other.

The bore-hole plate 3 has at least one bore hole 31 formed corresponding to the cylinder bores of the cylinder block 100.

The bore-hole plates 3 are formed into a ring shape on peripheries of the bore holes 31 which correspond to cylinder bores 101 formed in the cylinder block 100. The number of bore-hole plates 3 corresponds to the number of cylinder bores 101. In this embodiment, since the number of cylinder bores 101 is four, four bore-hole plates 3 are provided corresponding to the number of cylinder bores 101.

The intermediate plate 4 corresponds to a water jacket 102 formed around the cylinder bores 101 of the cylinder block 100, and is disposed so as to close an upper side of the water jacket 102. The intermediate plate 4 is formed of one plate disposed between the bore-hole plates 3 and the main plate 5 so as to surround outer peripheries of the respective bore-hole plates 3 disposed inside the intermediate plate 4. The intermediate plate 4 has a suitable number of flow passage holes 41 which allow cooling water in the water jacket 102 to pass therethrough.

In a mode where the cylinder head gasket 1 does not include the intermediate plate 4, the main plate 5 is disposed so as to surround the bore-hole plates 3.

In a mode where the cylinder head gasket 1 includes the intermediate plate 4, the main plate 5 is formed of one plate which is formed so as to surround an outer periphery of the intermediate plate 4, and the main plate 5 forms an outermost periphery of the cylinder head gasket 1. That is, all of the bore-hole plates 3 and the intermediate plate 4 are disposed inside the main plate 5. The main plate 5 has a suitable number of bolt holes 51 and a suitable number of flow passage holes 52. Bolt shafts are made to pass through the bolt holes 51 when the cylinder head 200 is fastened to the cylinder block 100 using bolts. Oil is made to pass through the flow passage holes 52.

A sealing portion 53 having a bead is formed on a peripheral edge portion of each flow passage hole 52, and the sealing portion 53 is made of a rubber elastic material. Examples of the rubber elastic material for forming the sealing portions 53 include NBR (nitrile rubber), ACM (acrylic rubber), HNBR (hydrogenated nitrile rubber), and FKM (fluororubber).

In this embodiment, each of the bore-hole plates 3, the intermediate plate 4 and the main plate 5 is formed using a flat plate. A seal bead or the like is not formed on any plate by bending.

A metal material may be used as a material for forming the respective plates 3, 4, 5. Examples of the metal material include aluminum, copper or a copper alloy, iron or an iron alloy, and stainless steel (SUS). From a viewpoint of increasing heat conductivity, aluminum, copper or a copper alloy is preferably used. Further, aluminum is preferably used from a viewpoint of manufacturing a gasket.

The respective plates 3, 4, 5 may either be made of the same material, or be made of different materials.

Particularly, taking into account that the cylinder block 100 reaches the highest temperature at a portion thereof on the cylinder bore 101 side, the bore-hole plates 3 and the intermediate plate 4 which are disposed close to the cylinder bores 101 are required to transfer heat having higher temperature to the cylinder head 200 than the main plate 5 disposed farthest from the cylinder bore 101 transfers. Accordingly, in the cylinder head gasket 1 according to this embodiment, the bore-hole plates 3 and the intermediate plate 4 are preferably made of a material having higher heat conductivity than a material for forming the main plate 5. A material having high heat conductivity such as aluminum, copper or a copper alloy, for example, is preferably used for forming the bore-hole plates 3 and the intermediate plate 4.

With such a configuration, it is possible to more efficiently transfer heat around the cylinder bores 101 which reaches the highest temperature to the cylinder head 200 through the cylinder head gasket 1.

In this embodiment, as described above, each bore-hole plate 3 and the intermediate plate 4 which are disposed adjacently to each other are separated from each other without being in contact with each other, and are spaced apart from each other with a predetermined distance therebetween. The intermediate plate 4 and the main plate 5 which are disposed adjacently to each other are separated from each other without being in contact with each other, and are spaced apart from each other with a predetermined distance therebetween. Each bore-hole plate 3 and the intermediate plate 4 are connected with each other with a heat insulating member 6 interposed therebetween. The intermediate plate 4 and the main plate 5 are connected with each other with a heat insulating member 7 interposed therebetween. With such a configuration, the bore-hole plates 3, the intermediate plate 4, and the main plate 5 are formed into an integral body.

The heat insulating member 6 is disposed between each bore-hole plate 3 and the intermediate plate 4 such that an outer peripheral edge surface 3a of each bore-hole plate 3 and an inner peripheral edge surface 4a of the intermediate plate 4 are integrally connected with each other. The heat insulating member 7 is disposed between the intermediate plate 4 and the main plate 5 such that an outer peripheral edge surface 4b of the intermediate plate 4 and an inner peripheral edge surface 5a of the main plate 5 are integrally connected with each other.

In the cylinder head gasket 1 of this embodiment, the respective bore-hole plates 3, the intermediate plate 4, and the main plate 5 are formed into an integral body by the heat insulating members 6, 7 and hence, heat conduction through these plates 3, 4, 5 in the plane direction is blocked by these heat insulating members 6, 7.

That is, heat of the respective bore-hole plates 3 which reaches the highest temperature is blocked by the heat insulating members 6 so that the heat is minimally transferred to the intermediate plate 4. Heat of the intermediate plate 4 is also blocked by the heat insulating member 7 so that the heat is minimally transferred to the main plate 5.

For this reason, according to the cylinder head gasket 1 of this embodiment, heat conduction through the cylinder head gasket 1 in the plane direction is restricted within each bore-hole plate 3, within the intermediate plate 4, and within the main plate 5 and hence, heat conduction through these plates 3, 4, 5 can be prevented. Accordingly, heat from the cylinder block 100 is rapidly transferred through the cylinder head gasket 1 in the thickness direction so that the heat is efficiently transferred to the cylinder head 200. As a result, a temperature difference between the cylinder block 100 and the cylinder head 200 can be eliminated at an early stage.

The heat insulating members 6, 7 are made of a material which can connect each bore-hole plate 3 and the intermediate plate 4 disposed adjacently to each other and can connect the intermediate plate 4 and the main plate 5 disposed adjacently to each other and, at the same time, can provide heat insulation between each bore-hole plate 3 and the intermediate plate 4 disposed adjacently to each other and between the intermediate plate 4 and the main plate 5 disposed adjacently to each other thus preventing heat conduction through the cylinder head gasket 1 in the plane direction. Although a material is not particularly limited, a rubber elastic material is preferably used from a viewpoint that a rubber elastic material is inexpensive and can be easily molded. In this embodiment, the heat insulating members 6, 7 made of a rubber elastic material are shown.

Examples of a specific rubber elastic material used for forming the heat insulating member 6 include FKM (fluororubber) and VMQ (silicone rubber).

Examples of a specific rubber elastic material used for forming the heat insulating member 7 include NBR (nitrile rubber), EPDM (ethylene-propylene rubber), HNBR (hydrogenated nitrile rubber), and FKM (fluororubber).

A rubber elastic material (heat insulating members 6, 7, sealing portion 53) used in the cylinder head gasket 1 is formed by integral molding, and is manufactured under conditions (secondary crosslinking (vulcanization)). In terms of these requirements for a rubber elastic material, FKM (fluororubber), which can satisfy these requirements, is preferably used.

It is preferable that, as shown in FIG. 2 and FIG. 3, a seal bead 61, 71 be integrally formed with the heat insulating member 6, 7 made of a rubber elastic material. With such a configuration, it is unnecessary to form a bead by bending a plate. Accordingly, the cylinder head gasket 1 having a bead can be easily formed.

The seal bead 61 is formed so as to project from a front surface and a back surface of the heat insulating member 6 respectively, and to surround the bore-hole plate 3. The seal bead 71 is formed so as to project from a front surface and a back surface of the heat insulating member 7, and to surround the intermediate plate 4.

As described above, when the heat insulating member 6, 7 is made of a rubber elastic material, and the seal bead 61, 71 is integrally formed with the heat insulating member 6, 7, it is possible to acquire an advantageous effect that when a cylinder head is fastened to a cylinder block using bolts with the cylinder head gasket 1 interposed between the cylinder head and the cylinder block, a bolt fastening load (fastening torque) can be reduced. That is, even when a bolt fastening load is reduced, the seal beads 61, 71 made of a rubber elastic material are compressed so that sealing can be provided.

When a bolt fastening load can be reduced, it is possible to also acquire an advantageous effect that deformation of a bore can be suppressed. That is, when a bolt fastening load is large, a large compression load is applied to a bore portion of the cylinder block and hence, a bore cylinder is distorted. As a result, friction of a piston is increased thus giving rise to a possibility that a fuel economy is lowered. On the other hand, according to this embodiment, the seal beads 61, 71 are not formed of a metal bead but are made of a rubber elastic material and hence, even when a bolt fastening load is reduced, a favorable sealing state can be formed due to compression of the rubber elastic material. Accordingly, distortion of the bore cylinder can be suppressed so that friction of the piston is lowered and hence, a fuel economy can be enhanced. Further, required rigidity of the engine block can be also lowered and hence, it is possible to expect a reduction in weight and a reduction in cost of the engine block.

The heat insulating member 6 made of a rubber elastic material is baked between the outer peripheral edge surface 3a of each bore-hole plate 3 and the inner peripheral edge surface 4a of the intermediate plate 4. The heat insulating member 7 made of a rubber elastic material is baked between the outer peripheral edge surface 4b of the intermediate plate 4 and the inner peripheral edge surface 5a of the main plate 5. With such a configuration, the respective bore-hole plates 3, intermediate plate 4, and main plate 5 are integrally connected with each other.

It is preferable that the heat insulating member 6, 7 which includes the seal bead 61, 71 include, over the whole circumference of the seal bead 61, 71 on the inner peripheral side or the outer peripheral side, a thin wall portion 62, 72 having a smaller thickness than the bore-hole plate 3, the intermediate plate 4 and the main plate 5. With the formation of these thin wall portions 62, 72, when the seal beads 61, 71 are compressed between the cylinder block 100 and the cylinder head 200, the deformed seal beads 61, 71 are stored in the thin wall portions 62, 72. Accordingly, deformation of the heat insulating members 6, 7 in the plane direction can be suppressed so that it is possible to suppress the displacement of the bore-hole plates 3, the intermediate plate 4 and the main plate 5 caused by the deformation of the heat insulating members 6, 7 in the plane direction.

In this specification, the bore-hole plate 3, the intermediate plate 4 and the main plate 5 are collectively referred to as "plates" in a simple manner when necessary. Also in a mode where the cylinder head gasket 1 does not include the intermediate plate 4 so that the cylinder head gasket 1 is formed of the bore-hole plates 3 and the main plate 5, the bore-hole plate 3 and the main plate 5 are collectively referred to as "plates" in a simple manner when necessary.

In this embodiment, the thin wall portion 62 is formed on the inner peripheral side of each seal bead 61, and the thin wall portion 72 is formed on the outer peripheral side of the seal bead 71. To facilitate the deformation of the respective seal beads 61, 71 toward the thin wall portions 62, 72 in an inclined manner when the seal beads 61, 71 are compressed, as shown in FIG. 2 and FIG. 3, an inclined surface 61a is formed on the outer peripheral side of the seal bead 61, and an inclined surface 71a is formed on the inner peripheral side of the seal bead 71.

In the heat insulating members 6, 7, it is preferable that a lightened portion 63 which penetrates the gasket from front to back be formed at least at a portion disposed between the bore-hole plates 3, 3 disposed adjacently to each other. To be more specific, in each heat insulating member 6 which connects each bore-hole plate 3 and the intermediate plate 4 with each other, it is preferable that the lightened portion 63 be formed at a portion disposed between the bore-hole plates 3, 3 disposed adjacently to each other as shown in FIG. 2. In this embodiment, the thin wall portion 62 of each heat insulating member 6 has two lightened portions 63 including the lightened portion 63 formed between the bore-hole plates 3, 3 disposed adjacently to each other.

A portion between the bore-hole plates 3, 3 disposed adjacently to each other is a portion which reaches the highest temperature due to heat from the cylinder bores 101 disposed on both sides of the portion. Accordingly, a portion of the heat insulating member 6 disposed between the bore-hole plates 3, 3 is also always exposed to a high temperature so that a high heat load is applied to such a portion of the heat insulating member 6. By forming the lightened portion 63 which penetrates the gasket from front to back at such a portion of the heat insulating member 6, the lightened portion 63 forms an air layer thus having a heat insulation effect. Accordingly, a heat load on the heat insulating member 6 is reduced and hence, durability of the heat insulating member 6 can be enhanced.

Although the lightened portion 63 is partially formed at a portion to which a high heat load is applied. A portion where the lightened portion 63 is formed is not limited to the heat insulating member 6. The lightened portion 63 may be also formed in the heat insulating member 7 when necessary. The number of lightened portions 63 is not particularly limited.

In the above-mentioned embodiment, the most preferable cylinder head gasket 1 which includes the bore-hole plates 3, the intermediate plate 4 and the main plate 5 is exemplified. However, in view of solving the problem of the present invention, it is sufficient for the cylinder head gasket 1 to include a plurality of plates connected to each other by a heat insulating member. Accordingly, the cylinder head gasket 1 may include only bore-hole plates and a main plate disposed outside the bore-hole plates. Alternatively, the cylinder head gasket 1 may include four or more kinds of plates. The same goes for the following another embodiment.

Second Embodiment

In this embodiment, bore-hole plates, an intermediate plate, and a main plate are connected with each other with a heat insulating member and bridge members made of metal interposed between each bore-hole plate and the intermediate plate and between the intermediate plate and the main plate.

Hereinafter, a second embodiment of the present invention is described. With respect to constitutional components in this embodiment substantially equal to corresponding constitutional components in the above-mentioned first embodiment, the description in the first embodiment is used, and the description of such constitutional components is omitted.

Figure 5:
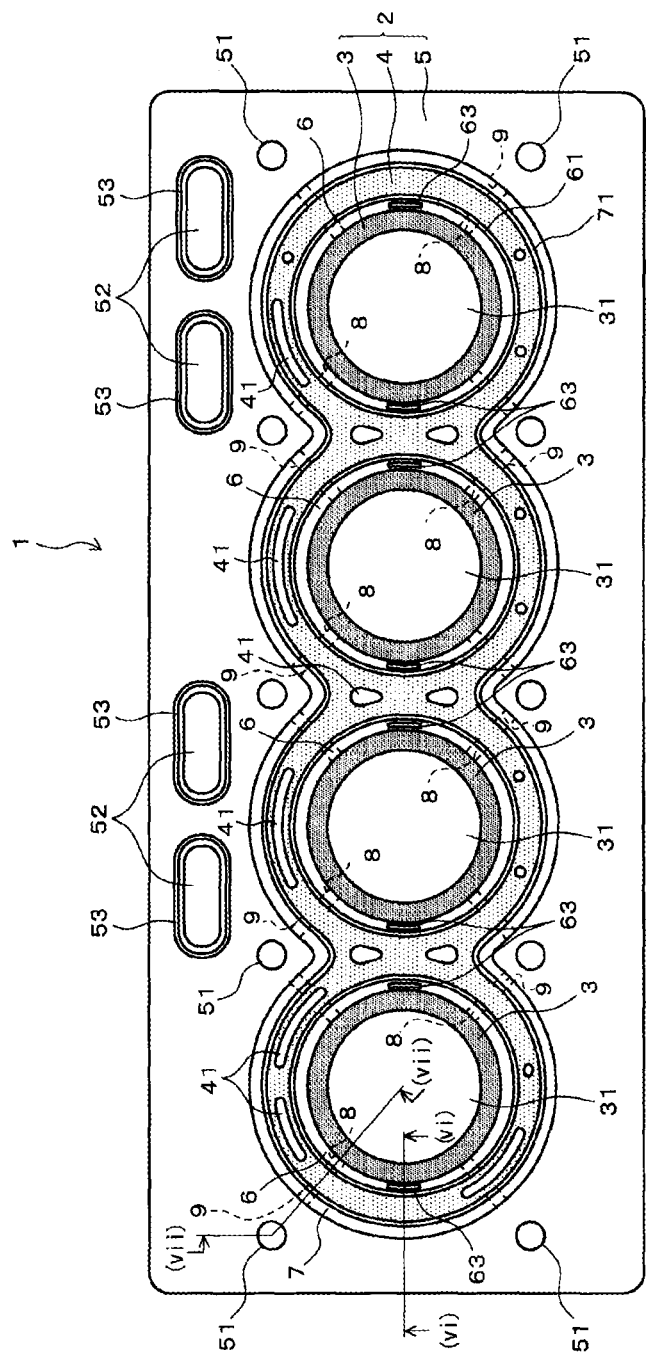
FIG. 5 is a plan view showing a cylinder head gasket according to a second embodiment of the present invention.
Figure 6:
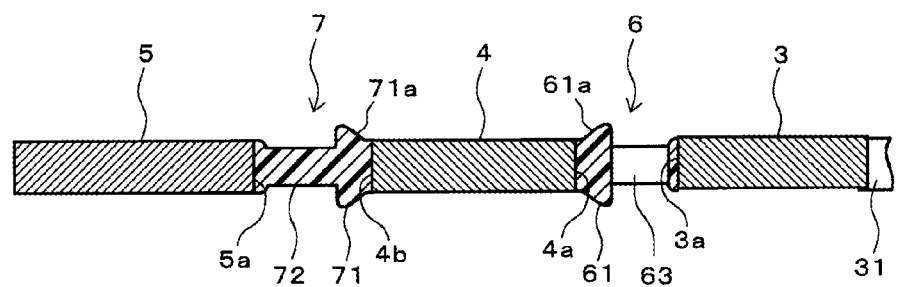
FIG. 6 is a cross-sectional view taken along a line (vi)-(vi) in FIG. 5.
Figure 7:
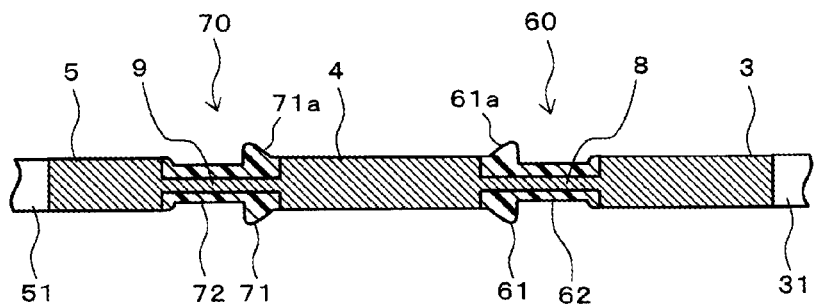
FIG. 7 is a cross-sectional view taken along a line (vii)-(vii) in FIG. 5.

FIG. 5 is a plan view showing a cylinder head gasket according to the second embodiment of the present invention. FIG. 6 is a cross-sectional view taken along a line (vi)-(vi) in FIG. 5. FIG. 7 is a cross-sectional view taken along a line (vii)-(vii) in FIG. 5.

A point which makes the cylinder head gasket 1 of the second embodiment different from the cylinder head gasket 1 of the first embodiment is as follows. That is, in the first embodiment, each bore-hole plate 3 and the intermediate plate 4 are connected with each other only by the heat insulating member, and the intermediate plate 4 and the main plate 5 are connected with each other only by the heat insulating member. In the second embodiment, however, each bore-hole plate 3 and the intermediate plate 4 are connected with each other not only by the heat insulating member 6 but also by bridge members 8 made of metal. Further, the intermediate plate 4 and the main plate 5 are connected with each other not only by the heat insulating member 7 but also by bridge members 9 made of metal.

As shown in FIG. 5 to FIG. 7, the bridge members 8 made of metal are integrally connected with each bore-hole plate 3 and intermediate plate 4, and the bridge members 9 made of metal are integrally connected with the intermediate plate 4 and the main plate 5. With such a configuration, the bridge members 8 made of metal connect each bore-hole plate 3 and the intermediate plate 4 disposed adjacently to each other, and the bridge members 9 made of metal connect the intermediate plate 4 and the main plate 5 disposed adjacently to each other. That is, the bore-hole plates 3 and the main plate 5 are connected with each other with the bridge members 8, 9 interposed therebetween.

The bridge members 8, 9 can be integrally formed with the bore-hole plates 3, the intermediate plate 4 and the main plate 5 by press molding. It may be possible to adopt the configuration where the bridge members 8, 9 are formed separately from the bore-hole plates 3, the intermediate plate 4, and the main plate 5, and the bridge members 8, 9 are joined to the bore-hole plates 3, the intermediate plate 4 and the main plate 5.

By forming the bridge members 8, 9 as described above, the bore-hole plates 3, the intermediate plate 4, and the main plate 5 are formed into an integral member before a cylinder head gasket is assembled so that the number of parts can be reduced. Further, there is no possibility that a relative positional relationship between the bore-hole plates 3, the intermediate plate 4, and the main plate 5 changes and hence, handling of these plates is facilitated. Since the relative positional relationship between the bore-hole plates 3, the intermediate plate 4, and the main plate 5 does not change, assembly manufacturing of the cylinder head gasket is facilitated.

It is preferable that at least one bridge member 8, 9 be provided for each bore-hole plate 3.

The number of bridge members 8, 9 is preferably as few as possible. By reducing the number of bridge members 8, 9, the bore-hole plates 3, the intermediate plate 4, and the main plate 5 can be formed into an integral body before the cylinder head gasket is assembled while reducing an amount of heat transferred from the bore-hole plate 3 to the intermediate plate 4 and main plate 5.

It is preferable that the bridge members 8, 9 be formed at positions where an opening between a cylinder block 100 and a cylinder head 200 is small or positions where motion such as sliding minimally occurs. That is, the bridge members 8, 9 are preferably formed not particularly limited at four portions in the vicinity of bolt holes 51.

It is preferable that the bridge members 8, 9 be covered by rubber members 60, 70. As a material for forming these rubber members 60, 70, a rubber elastic material equal to the rubber elastic material which is named as a material for forming the heat insulating members 6, 7 in the above-mentioned first embodiment can be used. By covering the bridge members 8, 9 by the rubber members 60, 70, it is possible to acquire an advantageous effect that the bridge members 8, 9 can be reinforced.

As in the case of the first embodiment, when the main plate 5, the intermediate plate 4, and the bore-hole plate 3 are separated from each other without being in contact with each other, and these plates are connected with each other with the heat insulating member interposed between the main plate 5 and the intermediate plate 4 and between the intermediate plate 4 and each bore-hole plate 3, the transfer of heat in the plane direction can be suppressed. On the other hand, however, respective plates 3, 4, 5 are separated from each other and hence, there still remains a problem that the positioning of the respective plates 3, 4, 5 at the time of baking rubber and the assembling of the respective plates 3, 4, 5 become complicated.

On the other hand, according to the second embodiment, connecting portions which connect the plates with each other are mainly formed of the heat insulating members 6, 7, and the bridge members 8, 9 form only extremely small portions of the connecting portion. Accordingly, although heat insulating properties in this embodiment may be slightly lowered compared with the first embodiment, heat conduction through the gasket in the plane direction can be sufficiently suppressed. In addition to the above, it is possible to acquire a remarkable effect that positioning and assembling of the respective plates 3, 4, 5 can be facilitated.

The invention claimed is:

1. A cylinder head gasket to be mounted between a cylinder block and a cylinder head of an engine, the cylinder head gasket comprising:
    at least one bore-hole plate having a bore hole which corresponds to a cylinder bore of the cylinder block;
    a main plate disposed so as to surround the bore-hole plate, and
    an intermediate plate between the main plate and the bore-hole plate, the intermediate plate corresponding to a water jacket formed around the cylinder bore, wherein
    the main plate, the intermediate plate, and the bore-hole plate are separated from each other without being in contact with each other, and
    the main plate, the intermediate plate, and the bore-hole plate are connected with each other with a heat insulating member interposed between the main plate and the intermediate plate and between the intermediate plate and the bore-hole plate.

2. The cylinder head gasket according to claim 1, wherein the heat insulating member is made of a rubber elastic material.

3. The cylinder head gasket according to claim 1, wherein the bore-hole plate and the intermediate plate are made of a material having higher heat conductivity than a material for forming the main plate.

4. The cylinder head gasket according to claim 1, wherein a seal bead is integrally formed with the heat insulating member.

5. The cylinder head gasket according to claim 4, wherein
the heat insulating member includes, on an inner peripheral side or an outer peripheral side of the seal bead, a thin wall portion having a smaller thickness than the plate.

6. The cylinder head gasket according to claim 1, wherein
a lightened portion which penetrates the gasket from front to back is formed in a portion of the heat insulating member disposed between one bore-hole plate and another bore-hole plate disposed adjacently to said one bore-hole plate, the portion of the heat insulating member reaching a high temperature due to heat from the cylinder bore.

7. A cylinder head gasket to be mounted between a cylinder block and a cylinder head of an engine, the cylinder head gasket comprising:
at least one bore-hole plate having a bore hole which corresponds to a cylinder bore of the cylinder block; and
a main plate disposed so as to surround the bore-hole plate, wherein
the bore-hole plate and the main plate are connected with each other with a heat insulating member and a bridge member made of metal interposed between the bore-hole plate and the main plate.

8. The cylinder head gasket according to claim 7, wherein
at least one bridge member is provided for each bore-hole plate.

9. The cylinder head gasket according to claim 7, wherein
the bridge member is covered by a rubber member.

10. The cylinder head gasket according to claim 7, wherein
the heat insulating member is made of a rubber elastic material.

11. The cylinder head gasket according claim 7, wherein
a seal bead is integrally formed with the heat insulating member.

12. The cylinder head gasket according to claim 11, wherein
the heat insulating member includes, on an inner peripheral side or an outer peripheral side of the seal bead, a thin wall portion having a smaller thickness than the plate.

13. The cylinder head gasket according to claim 7, wherein
a lightened portion which penetrates the gasket from front to back is formed in a portion of the heat insulating member disposed between one bore-hole plate and another bore-hole plate disposed adjacently to said one bore-hole plate, the portion of the heat insulating member reaching a high temperature due to heat from the cylinder bore.

* * * * *